United States Patent
Liu et al.

(10) Patent No.: US 12,173,485 B2
(45) Date of Patent: Dec. 24, 2024

(54) DEVICE FOR DIVERTING AND DEFOAMING WITH BENT PIPE APPLIED TO HIGH HEAD WATER SUPPLY STRUCTURE

(71) Applicant: GUANGDONG RESEARCH INSTITUTE OF WATER RESOURCES AND HYDROPOWER, Guangzhou (CN)

(72) Inventors: Da Liu, Guangzhou (CN); Bensheng Huang, Guangzhou (CN); Jing Qiu, Guangzhou (CN); Ming Li, Guangzhou (CN); Chao Tan, Guangzhou (CN); Lei Guo, Guangzhou (CN)

(73) Assignee: GUANGDONG RESEARCH INSTITUTE OF WATER RESOURCES AND HYDROPOWER, Guangdong (CN)

( * ) Notice: Subject to any disclaimer, the term of this patent is extended or adjusted under 35 U.S.C. 154(b) by 434 days.

(21) Appl. No.: 17/421,720

(22) PCT Filed: Feb. 22, 2019

(86) PCT No.: PCT/CN2019/075898
§ 371 (c)(1),
(2) Date: Jul. 8, 2021

(87) PCT Pub. No.: WO2020/147165
PCT Pub. Date: Jul. 23, 2020

(65) Prior Publication Data
US 2022/0106776 A1     Apr. 7, 2022

(30) Foreign Application Priority Data

Jan. 17, 2019  (CN) ............ 201910043801.9

(51) Int. Cl.
*E03B 7/07*        (2006.01)
*B01D 19/00*       (2006.01)
(Continued)

(52) U.S. Cl.
CPC .......... *E03B 7/074* (2013.01); *B01D 19/0042* (2013.01); *E03B 11/12* (2013.01); *B01D 19/02* (2013.01); *Y10S 435/812* (2013.01)

(58) Field of Classification Search
CPC . E03B 7/074; E03B 11/12; E03B 7/07; B01D 19/0042; B01D 19/02; Y10S 435/812; Y02A 20/00
See application file for complete search history.

(56) References Cited

U.S. PATENT DOCUMENTS 3,520,822 A * 7/1970 Traelnes ................ B01D 19/02
                                                96/177
4,100,071 A * 7/1978 Beurer .................. B01F 23/454
                                                210/197

(Continued)

FOREIGN PATENT DOCUMENTS

CN      200964584       10/2007
CN      102619200 A      8/2012
(Continued)

OTHER PUBLICATIONS

International Search Report and Written Opinion in PCT/CN2019/075898 mailed Oct. 22, 2019.

*Primary Examiner* — Stephen Hobson
(74) *Attorney, Agent, or Firm* — Buchalter; Jason W. Croft

(57) ABSTRACT

A device for diverting and defoaming with a bent pipe applied to a high head water supply structure includes an inner well, an outer well, a baffle, and a plurality of overflow pipes. The baffle is respectively connected with an outer wall of the inner well and an inner wall of the outer well to form (Continued)

an overflow groove, the top end of the inner well is higher than the baffle to form an overflow weir, one end of the overflow pipe is provided with a first pipe orifice in the overflow groove, the other end of the overflow pipe is communicated with the inner well to form a second pipe orifice, the first pipe orifice is higher than the second pipe orifice, the overflow pipe is bent in the overflow groove to form a first bending part, and the first bending part is higher than the first pipe orifice.

9 Claims, 4 Drawing Sheets

(51) Int. Cl.
*E03B 11/12* (2006.01)
*B01D 19/02* (2006.01)

(56) References Cited

U.S. PATENT DOCUMENTS

| | | | | |
|---|---|---|---|---|
| 4,256,837 A | * | 3/1981 | Fluri | C12M 23/36 |
| | | | | 435/801 |
| 4,258,008 A | * | 3/1981 | Gragg | C01B 25/223 |
| | | | | 422/616 |
| 4,310,437 A | * | 1/1982 | Schreiber | C12M 41/02 |
| | | | | 261/93 |
| 4,508,546 A | * | 4/1985 | Zlokarnik | B01D 19/02 |
| | | | | 95/242 |
| 4,648,973 A | * | 3/1987 | Hultholm | B01F 23/30 |
| | | | | 210/629 |
| 5,476,573 A | * | 12/1995 | Hirose | C12M 29/02 |
| | | | | 210/608 |
| 5,518,618 A | * | 5/1996 | Mulder | C02F 3/085 |
| | | | | 210/195.3 |
| 6,666,967 B1 | * | 12/2003 | Oyabu | B01D 19/0005 |
| | | | | 210/220 |
| 6,689,334 B1 | * | 2/2004 | Schutte | B01D 19/02 |
| | | | | 562/125 |
| 7,833,298 B2 | * | 11/2010 | Larnholm | B01D 45/12 |
| | | | | 55/482 |
| 8,585,869 B1 | * | 11/2013 | Duesel, Jr. | C02F 1/048 |
| | | | | 203/79 |
| 8,808,497 B2 | * | 8/2014 | Duesel, Jr. | C02F 1/10 |
| | | | | 159/32 |
| 2003/0150788 A1 | * | 8/2003 | Sharb | B01D 21/0042 |
| | | | | 210/256 |
| 2018/0272252 A1 | * | 9/2018 | Kelkar | B01D 19/0042 |

FOREIGN PATENT DOCUMENTS

| | | | | |
|---|---|---|---|---|
| CN | 106337401 A | | 1/2017 | |
| CN | 106984069 A | * | 7/2017 | B01D 19/02 |
| CN | 108265684 A | * | 7/2018 | E02B 8/06 |
| CN | 108612059 A | | 10/2018 | |
| CN | 109138064 A | * | 1/2019 | E03B 11/12 |
| CN | 110029703 A | * | 7/2019 | E03B 11/12 |
| CN | 209099446 U | * | 7/2019 | |
| CN | 210151830 U | * | 3/2020 | E03B 11/12 |
| DE | 19825150 A1 | * | 2/2000 | A01K 63/04 |
| FR | 2779660 A1 | * | 12/1999 | B01D 19/047 |
| KR | 1020070100100 A | | 10/2007 | |
| WO | WO-2006087349 A1 | * | 8/2006 | E03F 1/002 |
| WO | 2020147165 A1 | | 7/2020 | |
| WO | WO-2023198581 A1 | * | 10/2023 | B01D 19/0005 |

* cited by examiner

B-B

DEVICE FOR DIVERTING AND DEFOAMING WITH BENT PIPE APPLIED TO HIGH HEAD WATER SUPPLY STRUCTURE

CROSS-REFERENCE TO RELATED APPLICATIONS

This application is a national stage filing under 35 U.S.C. § 371 of international application number PCT/CN2019/075898, filed Feb. 22, 2019, which claims priority to Chinese patent application No. 201910043801.9 filed Jan. 17, 2019. The contents of these applications are incorporated herein by reference in their entirety.

TECHNICAL FIELD

The present disclosure relates to a hydraulic structure, and more particularly, to a device for diverting and defoaming with a bent pipe applied to a high head water supply structure.

BACKGROUND

A high-level pool is a hydraulic structure specially used for long-distance water supply and has a main function of stabilizing a color temperature tail water level of a pumping station, and may regulate a water level in a well, so that the stability of a water supply head is ensured. The high-level pool is usually designed as a cylinder. After entering from a water inlet pipe, water passes through an annular overflow weir first, and then overflows into the well. A lower part of the well is connected with a water outlet pipe, and the water level in the well is changed with changes of a flow rate and a head loss.

In the existing technology, common high-level water pool is technically defective in that a drop height from the annular overflow weir to the lowest operating water level is large, which may cause a large number of bubbles to be mixed into water body, and the bubbles enter the water outlet pipe along with water flow, which aggravates a fluctuation range of a water pressure of a water supply pipeline, thus being very unbeneficial for safety of a long-distance water supply pipeline.

SUMMARY

The technical problem to be solved by the present disclosure is to provide a device for diverting and defoaming with a bent pipe applied to a high head water supply structure, which can overcome the technical problems of a large drop height of water level and serious aeration of water flow in an annular overflow weir of a traditional high-level pool.

Technical solutions for solving the above technical problems are as follows.

A device for diverting and defoaming with a bent pipe applied to a high head water supply structure includes an inner well, an outer well, a baffle, and a plurality of overflow pipes, wherein the outer well is arranged externally around the inner well, a top end of the outer well is higher than a top end of the inner well, the baffle is respectively connected with an outer wall of the inner well and an inner wall of the outer well to form an overflow groove, the top end of the inner well is higher than the baffle to form an overflow weir, one end of the overflow pipe is provided with a first pipe orifice in the overflow groove, the other end of the overflow pipe is communicated with the inner well to form a second pipe orifice, the first pipe orifice is higher than the second pipe orifice, the overflow pipe is bent in the overflow groove to form a first bending part, and the first bending part is higher than the first pipe orifice.

As an improvement, one end of the overflow pipe communicated with the inner well is bent to form a second bending part, the overflow pipe penetrates through a side wall of the inner well to form the second pipe orifice, and the second bending part enables a fluid in the overflow pipe to be upwardly introduced into the inner well through the second pipe orifice.

As an improvement, an incident angle between the second pipe orifice and a vertical direction is 20° to 80°.

As an improvement, the overflow pipe is provided with a through hole in the overflow groove, the through hole penetrates through a pipe wall of the overflow pipe, and the through hole is positioned higher than the first pipe orifice.

As an improvement, the through hole is arranged at a highest point of the first bending part.

As an improvement, a cover plate covering the through hole is arranged in the overflow groove, and a gap is arranged between the cover plate and the through hole.

As an improvement, the cover plate is rectangular in shape, and four upright posts supporting the cover plate are arranged between the cover plate and the baffle.

As an improvement, the overflow pipes are provided in an even number, the overflow pipes are respectively arranged around the inner well and are symmetrically arranged about a center of the inner well.

As an improvement, four overflow pipes are provided, the overflow weir is cylindrical in shape, and the overflow pipes are circumferentially arrayed around the overflow weir.

Beneficial effects: the overflow pipe may divert a water flow passing through the overflow weir. Aeration phenomenon can be better restrained by injecting the water flow into the inner well through the overflow pipe than by dropping the water flow into the inner well through the overflow weir. A lowest operating water level in the well is arranged in the inner well, and the second pipe orifice is arranged below the lowest operating water level in the well, so that the water flow passing through the overflow pipe may flow into the inner well below the lowest operating water level in the well, which may form a submerged water flow, thus being beneficial for reducing aeration in the water flow. The first bending part is higher than the first pipe orifice, so that water in the overflow groove can be introduced into the inner well through the overflow pipe only after the water depth reaches a certain depth, which can prevent a suction vortex caused by an excessively shallow water depth in the overflow groove, thus being beneficial for reducing aeration generated during the drainage of the overflow pipe, and being beneficial for reducing vibration of the whole device.

BRIEF DESCRIPTION OF DRAWINGS

The present disclosure is further described hereinafter with reference to the accompanying drawings.

DETAILED DESCRIPTION

Figure 1:
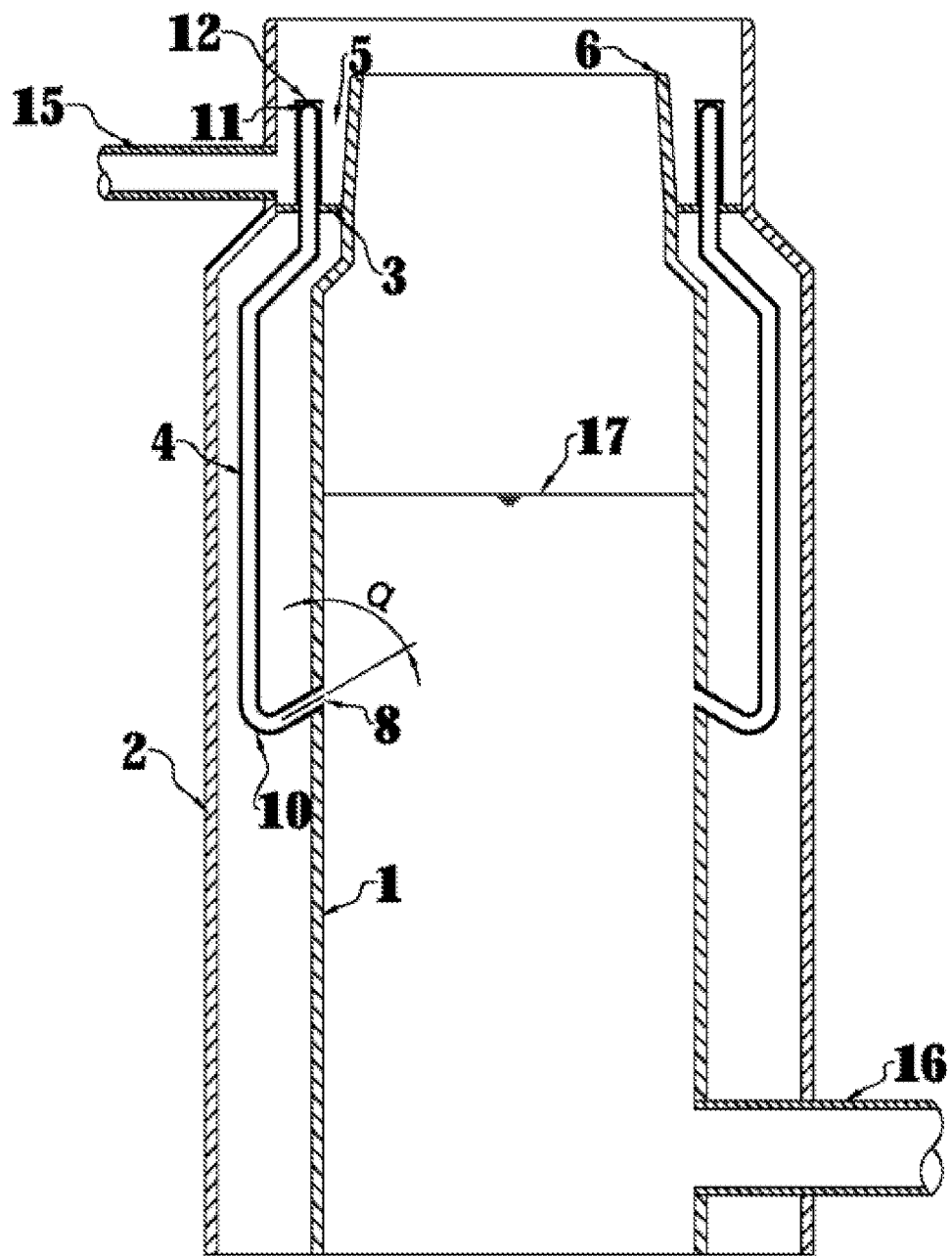
FIG. 1 is a schematic diagram of a structure according to an embodiment of the present disclosure.
Figure 2:
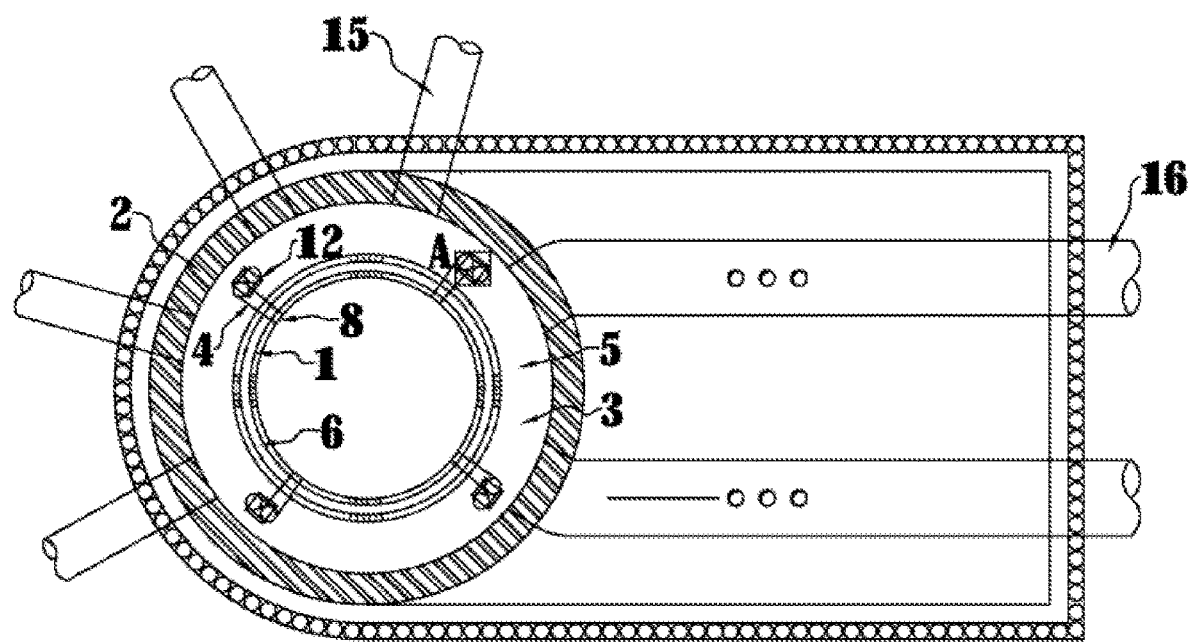
FIG. 2 is a top view of the structure according to an embodiment of the present disclosure.
Figure 3:
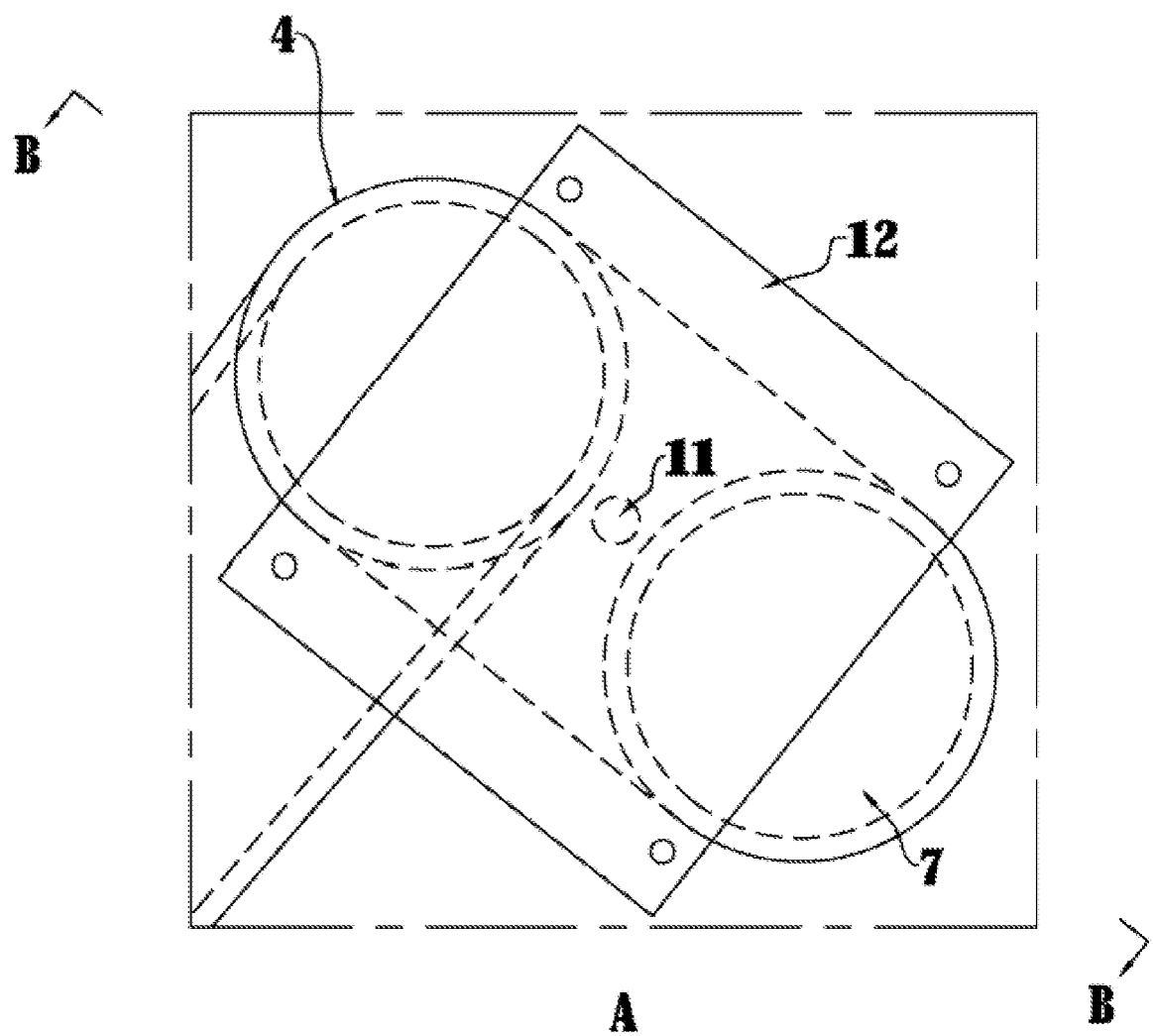
FIG. 3 is an enlarged view of a part A in FIG. 2 according to an embodiment of the present disclosure.
Figure 4:
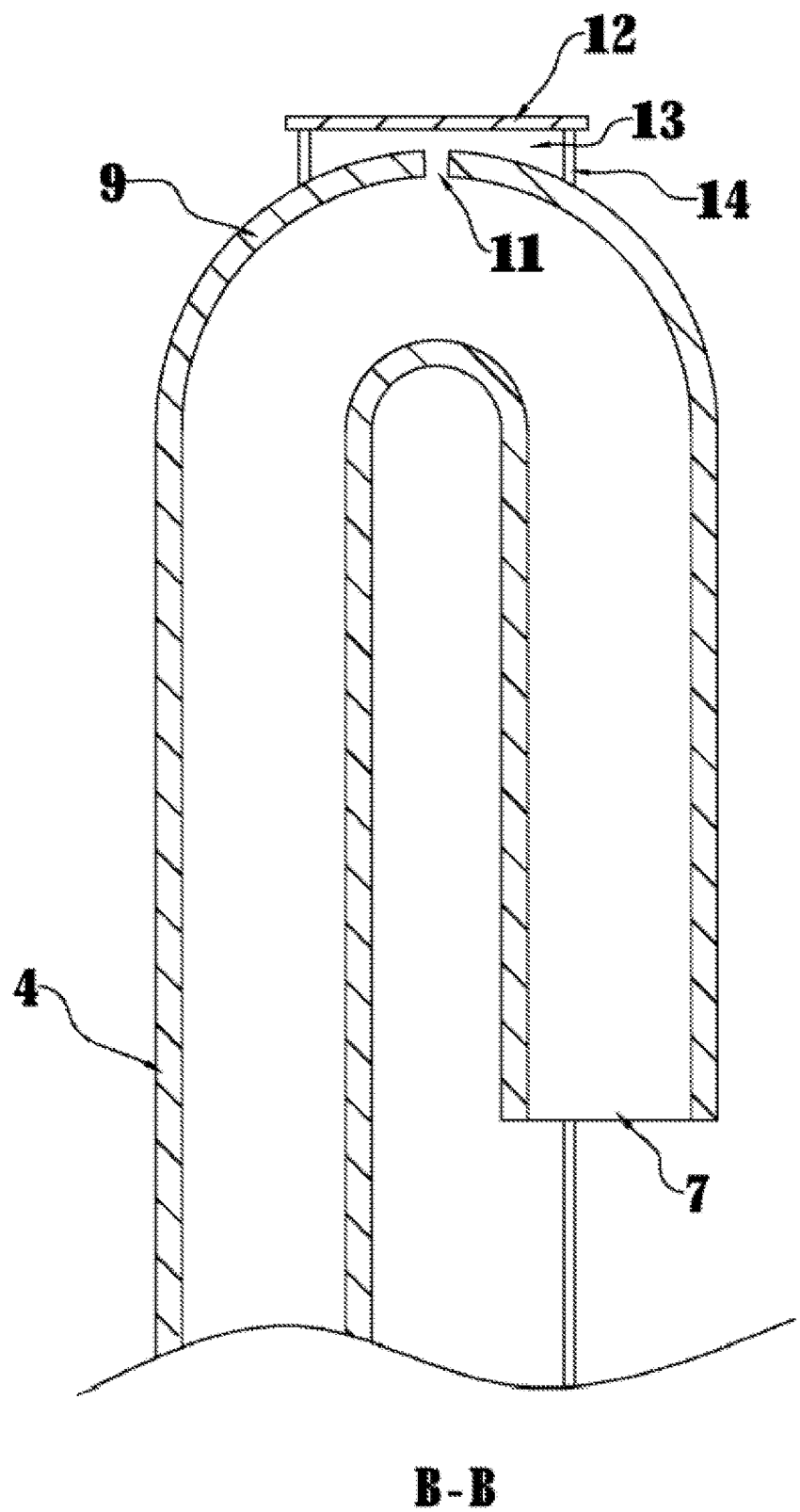
FIG. 4 is a sectional view of a cross section B in FIG. 3 according to an embodiment of the present disclosure.

With reference to FIG. 1 to FIG. 4, a device for diverting and defoaming with a bent pipe applied to a high head water supply structure includes an inner well 1, an outer well 2, a baffle 3, and four overflow pipes 4. The outer well 2 is arranged externally around the inner well 1, a top end of the outer well 2 is higher than a top end of the inner well 1, the baffle 3 is respectively connected with an outer wall of the inner well 1 and an inner wall of the outer well 2 and forms an overflow groove 5, and the top end of the inner well 1 is higher than the baffle 3 to form an overflow weir 6. One end of the overflow pipe 4 is provided with a first pipe orifice 7 in the overflow groove 5, and the other end of the overflow pipe 4 is communicated with the inner well 1 to form a second pipe orifice 8. The first pipe orifice 7 is higher than the second pipe orifice 8, the overflow pipe 4 is bent in the overflow groove 5 to form a first bending part 9, and the first bending part 9 is higher than the first pipe orifice 7.

In the embodiment, four water inlet pipes 15 communicated with the overflow groove 5 and two water outlet pipes 16 communicated with the inner well 1 are provided. The water inlet pipes 15 may inject water into the overflow groove 5 and enable the water flow to flow into the inner well 1 through the overflow weir 6 or the overflow pipe 4, and then to flow out from the inner well 1 through the water outlet pipes 16.

The overflow pipe 4 may divert the water flow passing through the overflow weir 6. Aeration phenomenon can be better restrained by injecting the water flow into the inner well 1 through the overflow pipe 4 than by dropping the water flow into the inner well 1 through the overflow weir 6. A lowest operating water level 17 in the well is arranged in the inner well 1, and the second pipe orifice 8 is arranged below the lowest operating water level 17 in the well, so that the water flow passing through the overflow pipe 4 may flow into the inner well 1 below the lowest operating water level 17 in the well, which may form a submerged water flow, thus being beneficial for reducing aeration in the water flow. The first bending part 9 is higher than the first pipe orifice 7, so that water in the overflow groove 5 can be introduced into the inner well 1 through the overflow pipe 4 only after the water depth reaches a certain depth, which can prevent a suction vortex caused by an excessively shallow water depth in the overflow groove 5, thus being beneficial for reducing aeration generated during drainage of the overflow pipe 4, and being beneficial for reducing vibration of the whole device.

In order to reduce bubbles entering the water outlet pipes 16, one end of the overflow pipe 4 communicated with the inner well 1 is bent to form a second bending part 10, the overflow pipe 4 penetrates through a side wall of the inner well 1 to form the second pipe orifice 8, and the second bending part 10 enables a fluid in the overflow pipe 4 to be upwardly introduced into the inner well 1 through the second pipe orifice 8. An incident angle α between the second pipe orifice 8 and a vertical direction is 20° to 80°. Preferably, in the embodiment, the incident angle α between the second pipe orifice 8 and the vertical direction is 60°. The incident angle α can reduce an impact of the water flow in the overflow pipe 4 on the side wall of the inner well 1, and can also reduce a chance of flushing the bubbles into the outlet pipes 16, thus being beneficial for reducing the aeration phenomenon of the device.

In order to reduce instability of the water flow in the overflow pipe 4 caused by a siphon effect of the overflow pipe 4, the overflow pipe 4 is provided with a through hole 11 in the overflow groove 5, the through hole 11 penetrates through a pipe wall of the overflow pipe 4, and the through hole 11 is positioned higher than the first pipe orifice 7. Preferably, in the embodiment, the through hole 11 is arranged at a highest point of the first bending part 9. When the water level in the overflow groove 5 is lower than the through hole 11, the through hole 11 can balance an air pressure in the overflow pipe 4 with an atmospheric pressure, which can eliminate the siphon effect caused by the first bending part 9 and make the water flow in the overflow pipe 4 more stable.

In order to control an air flow in the through hole 11, a cover plate 12 covering the through hole 11 is arranged in the overflow groove 5, and a gap 13 is arranged between the cover plate 12 and the through hole 13. The cover plate 12 slows down the air flow in the through hole 11, thus being beneficial for preventing the bubbles from being generated.

In order to make the cover plate 12 stable in structure, the cover plate 12 is rectangular in shape, and four upright posts 14 supporting the cover plate 12 are arranged between the cover plate 12 and the baffle 3.

In order to make the water flow in the inner well 1 stable, the overflow pipes 4 are provided in an even number, the overflow pipes 4 are respectively arranged around the inner well 1 and are symmetrically arranged about a center of the inner well 1. In the embodiment, four overflow pipes 4 are provided, the overflow weir 6 is cylindrical in shape, and the overflow pipes 4 are circumferentially arrayed around the overflow weir 6. Arrangement of the overflow pipes 4 symmetrically about the center of the inner well 1 can prevent flow deviation in the inner well 1, and prevent the bubbles in the inner well 1 from being brought into the water flow, thus alleviating the aeration phenomenon.

The implementations of the present disclosure are described in detail with reference to the accompanying drawings above, but the present disclosure is not limited to the above implementations, and various changes may also be made within the knowledge scope of those of ordinary skills in the art without departing from the gist of the present disclosure.

What is claimed is:

1. A device for diverting and defoaming with a bent pipe applied to a high head water supply structure, comprising an inner well, an outer well, a baffle, and a plurality of overflow pipes, wherein the outer well is arranged externally around the inner well, a top end of the outer well is higher than a top end of the inner well, the baffle is respectively connected with an outer wall of the inner well and an inner wall of the outer well to form an overflow groove, the top end of the inner well is higher than the baffle to form an overflow weir, one end of the overflow pipe is provided with a first pipe orifice in the overflow groove, the other end of the overflow pipe is communicated with the inner well to form a second pipe orifice, the first pipe orifice is higher than the second pipe orifice, the overflow pipe is bent in the overflow groove to form a first bending part, and the first bending part is higher than the first pipe orifice.

2. The device for diverting and defoaming with a bent pipe applied to a high head water supply structure of claim 1, wherein one end of the overflow pipe communicated with the inner well is bent to form a second bending part, the overflow pipe penetrates through a side wall of the inner well to form the second pipe orifice, and the second bending part enables a fluid in the overflow pipe to be upwardly introduced into the inner well through the second pipe orifice.

3. The device for diverting and defoaming with a bent pipe applied to a high head water supply structure of claim 2, wherein an incident angle between the second pipe orifice and a vertical direction is 20° to 80°.

4. The device for diverting and defoaming with a bent pipe applied to a high head water supply structure of claim 3, wherein the overflow pipe is provided with a through hole in the overflow groove, the through hole penetrates through a pipe wall of the overflow pipe, and the through hole is positioned higher than the first pipe orifice.

5. The device for diverting and defoaming with a bent pipe applied to a high head water supply structure of claim 4, wherein the through hole is arranged at a highest point of the first bending part.

6. The device for diverting and defoaming with a bent pipe applied to a high head water supply structure of claim 5, wherein a cover plate covering the through hole is arranged in the overflow groove, and a gap is arranged between the cover plate and the through hole.

7. The device for diverting and defoaming with a bent pipe applied to a high head water supply structure of claim 6, wherein the cover plate is rectangular in shape, and four upright posts supporting the cover plate are arranged between the cover plate and the baffle.

8. The device for diverting and defoaming with a bent pipe applied to a high head water supply structure of claim 1, wherein the overflow pipes are provided in an even number, the overflow pipes are respectively arranged around the inner well and are symmetrically arranged about a center of the inner well.

9. The device for diverting and defoaming with a bent pipe applied to a high head water supply structure of claim 8, wherein four overflow pipes are provided, the overflow weir is cylindrical in shape, and the overflow pipes are circumferentially arrayed around the overflow weir.

* * * * *